United States Patent
Li et al.

(10) Patent No.: US 8,576,340 B1
(45) Date of Patent: Nov. 5, 2013

(54) AMBIENT LIGHT EFFECTS AND CHROMINANCE CONTROL IN VIDEO FILES

(71) Applicants: Adam Li, Solana Beach, CA (US); Megan Farrell, San Diego, CA (US); Aixin Liu, San Diego, CA (US); Djung Nguyen, San Diego, CA (US)

(72) Inventors: Adam Li, Solana Beach, CA (US); Megan Farrell, San Diego, CA (US); Aixin Liu, San Diego, CA (US); Djung Nguyen, San Diego, CA (US)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/654,213

(22) Filed: Oct. 17, 2012

(51) Int. Cl.
*H04N 5/58* (2006.01)

(52) U.S. Cl.
USPC .......................................... 348/602; 348/603

(58) Field of Classification Search
USPC .......... 348/602, 603, 687; 345/204, 589, 207, 345/690, 102
IPC ................................................ H04N 5/57,5/58
See application file for complete search history.

(56) References Cited

U.S. PATENT DOCUMENTS

| | | | |
|---|---|---|---|
| 5,061,997 A | 10/1991 | Rea et al. | |
| 6,140,987 A | 10/2000 | Stein et al. | |
| 6,577,080 B2 | 6/2003 | Lys et al. | |
| 6,611,297 B1 | 8/2003 | Akashi et al. | |
| 7,180,529 B2 | 2/2007 | Covannon et al. | |
| 7,262,813 B2 | 8/2007 | Sato | |
| 7,369,903 B2 | 5/2008 | Diederiks et al. | |
| 7,616,262 B2 | 11/2009 | Eves et al. | |
| 7,859,595 B2 | 12/2010 | Gutta et al. | |
| 7,894,000 B2 | 2/2011 | Gutta et al. | |
| 7,932,953 B2 | 4/2011 | Gutta et al. | |
| 8,063,992 B2 | 11/2011 | Gutta et al. | |
| 2005/0206788 A1 | 9/2005 | Eves et al. | |
| 2006/0058925 A1 | 3/2006 | Diederiks et al. | |
| 2006/0161270 A1 | 7/2006 | Luskin et al. | |
| 2007/0091111 A1 | 4/2007 | Gutta | |
| 2007/0157281 A1 | 7/2007 | Ellis et al. | |
| 2007/0174773 A1 | 7/2007 | Abernethy, Jr. et al. | |
| 2007/0242162 A1 | 10/2007 | Gutta et al. | |
| 2007/0288849 A1 | 12/2007 | Moorer et al. | |
| 2007/0288975 A1 | 12/2007 | Cashman et al. | |
| 2008/0129821 A1 | 6/2008 | Howarter et al. | |
| 2008/0174254 A1 | 7/2008 | Abernethy et al. | |
| 2009/0123086 A1 | 5/2009 | Iwanami et al. | |
| 2009/0219305 A1 | 9/2009 | Diederiks et al. | |

(Continued)

OTHER PUBLICATIONS

Non-Final Office Action from U.S. Appl. No. 13/654,255 dated Jun. 19, 2013.

(Continued)

*Primary Examiner* — Sherrie Hsia
(74) *Attorney, Agent, or Firm* — Fitch, Even, Tabin & Flannery LLP

(57) ABSTRACT

Methods and systems for controlling ambient light effects associated with video content are provided. The method includes providing a receiving device configured to parse an incoming video file. The video file includes at least one track specifying at least one ambient light effect associated with at least one portion of the video file. The at least one track includes chrominance control data specifying at least one light color to be generated by the at least one lighting device. The method also includes parsing the video file at the receiving device to separate the track specifying the ambient light effect and the chrominance control data and sending a command to at least one lighting device to generate the ambient light effect specified in the track and the chrominance control data.

20 Claims, 1 Drawing Sheet

(56) References Cited

U.S. PATENT DOCUMENTS

| | | |
|---|---|---|
| 2009/0249428 A1 | 10/2009 | White et al. |
| 2010/0005062 A1 | 1/2010 | Van Den Dungen |
| 2010/0052843 A1 | 3/2010 | Cannistraro |
| 2010/0177247 A1 | 7/2010 | Sekulovski et al. |
| 2010/0262336 A1 | 10/2010 | Rivas et al. |
| 2010/0265414 A1 | 10/2010 | Nieuwlands |
| 2011/0075036 A1 * | 3/2011 | Galeazzi et al. .............. 348/602 |
| 2011/0245941 A1 | 10/2011 | De Waele et al. |
| 2012/0013257 A1 | 1/2012 | Sibert |

OTHER PUBLICATIONS

Non-Final Office Action from U.S. Appl. No. 13/654,190 dated Jul. 17, 2013.

* cited by examiner

AMBIENT LIGHT EFFECTS AND CHROMINANCE CONTROL IN VIDEO FILES

FIELD

This invention relates to ambient light effects, and more specifically, to ambient light effects generated based on chrominance control data associated with a video file.

BACKGROUND

Television programs, movies, and video games most commonly provide visual stimulation from a television screen display and audio stimulation from the speakers connected to the television. There are some known systems that attempt to enhance a viewer's/user's experience by providing a more interactive/responsive environment. For example, some video gaming systems cause lighting devices such as lamps to generate an ambient light effect ("ALE") during game play.

To provide an enjoyable interactive experience, the lighting devices need to generate the ambient light effects at appropriate times when the associated scene is displayed to a user. In addition, the lighting devices need to generate a variety of ambient light effects to appropriately match a variety of scenes and action sequences in a movie or a video game. Thus, an ambient light effect-capable system needs to be able to identify one or more scenes during the display of which an ambient light effect is to be generated.

One such system focuses on detecting and analyzing various parameters of the video file or video game application and generating ambient light effects based on the detected parameters. One problem with such an approach is that many video files and video games include various access restrictions imposed by the content providers, and such restrictions may make it difficult or impossible to analyze the parameters of a video file and/or video game.

Some existing systems include lighting devices that produce only various intensities and flickering of white colored light. A disadvantage of such systems is that while the television programs, movies, and video games typically include a wide variety of scenes, events, and action sequences, the known ambient light systems are limited to generating a single light color which may appear too repetitive to users and cause the users to lose interest in such ambient light effects.

Accordingly, what is needed is a way of producing ambient light effects in association with one or more portions of a video file that overcomes the aforementioned shortcomings.

SUMMARY

The present invention satisfies this need. In one embodiment, a method of producing an ambient light effect is provided. The method comprises: providing a receiving device configured to parse an incoming video file; receiving the video file at the receiving device, the video file including at least one track specifying at least one ambient light effect associated with at least one portion of the video file, the at least one track including chrominance control data specifying at least one light color to be generated by at least one lighting device in communication with the receiving device. The method further comprises parsing the video file at the receiving device to separate the at least one track specifying the at least one ambient light effect; sending a command from the receiving device to the at least one lighting device specified in the at least one track to generate the at least one ambient light effect specified in the at least one track; and causing the at least one lighting device receiving the command to generate the at least one light color specified by the chrominance control data when the at least one portion of the video file associated with the at least one ambient light effect is displayed.

The receiving device can be one of a television, set-top box, disc player, personal computer, laptop, tablet computer, and mobile phone.

In one approach, the at least one color specified by the chrominance control data is selected from red, green, blue, or combinations thereof.

The receiving device can be provided with at least one hardware component programmed to parse the video file to separate the at least one track specifying the chrominance control data.

In one aspect, the method includes specifying, in the at least one track, a color intensity of the at least one light color specified by the chrominance control data.

The at least one lighting device can include at least one hardware component programmed to interpret the chrominance control data received in the command from the receiving device. In one approach, the at least one hardware component can cause the at least one lighting device to generate the at least one light color specified by the chrominance control data. In another approach, at least one lighting device is provided with at least one software component programmed to interpret the chrominance control data received in the command from the receiving device. In yet another approach, the at least one software component can cause the at least one lighting device to generate the at least one light color specified by the chrominance control data.

In one approach, the at least one track identifies the at least one lighting device for generating the at least one light color specified by the chrominance control data. In another approach, the at least one track includes a predetermined time when the at least one light color based specified by the chrominance control data is to be generated by the at least one lighting device.

In one approach, the at least one portion of the video file is a predetermined event in a video contained in the video file and the predetermined event is associated with the at least one ambient light effect.

In one aspect, the sending a command from the receiving device to the at least one lighting device includes sending the command from the receiving device to the at least one lighting devices via one of a wired connection and a wireless connection. In another aspect, the sending a command from the receiving device to the at least one lighting device includes sending the command from the receiving device to the at least one lighting devices via a home automation system.

In another aspect, a system for controlling ambient light effects is provided. The system comprises a receiving device including at least one hardware component including a processor programmed to parse an incoming video file to separate at least one track specifying at least one ambient light effect associated with at least one portion of the video file, and at least one lighting device in communication with the receiving device. The at least one track includes chrominance control data specifying at least one light color to be generated by the at least one lighting device. The processor of the receiving device is programmed to send a command from the receiving device to the at least one lighting device to generate the at least one ambient light effect specified in the at least one track. The at least one lighting device includes at least one hardware component adapted, after receiving the command from the receiving device, to generate the at least one light color specified by the chrominance control data when the at least one portion of the video file associated with the at least one ambient light effect is displayed to a user.

In an aspect, the receiving device is at least one of a television, set-top box, disc player, personal computer, laptop, tablet computer, and mobile phone.

In one aspect, the at least one color specified by the chrominance control data is selected from red, green, blue, or combinations thereof.

In another aspect, the at least one track identifies the at least one lighting device for generating the at least one light color specified by the chrominance control data.

In yet another aspect, the at least one portion of the video file is a predetermined event in a video contained in the video file and the predetermined event is associated with the at least one ambient light effect and the at least one light color specified by the chrominance control data.

In yet another aspect, the receiving device and the at least one lighting device are adapted to communicate directly and indirectly via one of a wired connection and a wireless connection.

The systems and methods described herein provide an engaging experience to a user when watching television programming, movies, or playing video games. One advantage of the systems and methods described therein is that television programming, movies, and video games can be made more interactive for a user by including ambient light effects can be generated by one or more lighting devices based on information included as additional tracks in the video file representing the television program, movie, or video game. Another advantage of the systems and methods described herein is that unlike prior systems producing ambient light effects in various shades of white, the ambient light effects described herein can include a large variety of colors, for example, colors based on various combinations and shades of red, green, and blue. These and other advantages will be apparent upon consideration of the present specification.

DETAILED DESCRIPTION

Reference will now be made in detail to the present preferred embodiments of the invention, examples of which are illustrated in the accompanying drawings.

Generally, systems and methods are described herein for providing ambient light effects for a user when watching television programming, movies, or playing video games. The ambient light effects can be generated by one or more lighting devices based on information included as additional tracks in the video file representing the television program, movie, or video game. The tracks that specify the ambient light effects can include chrominance control data that can result in the ambient light effects to be generated in variety of colors based on an RGB color model. As such, a dynamic and more interactive experience is provided for a user.

Figure 1:
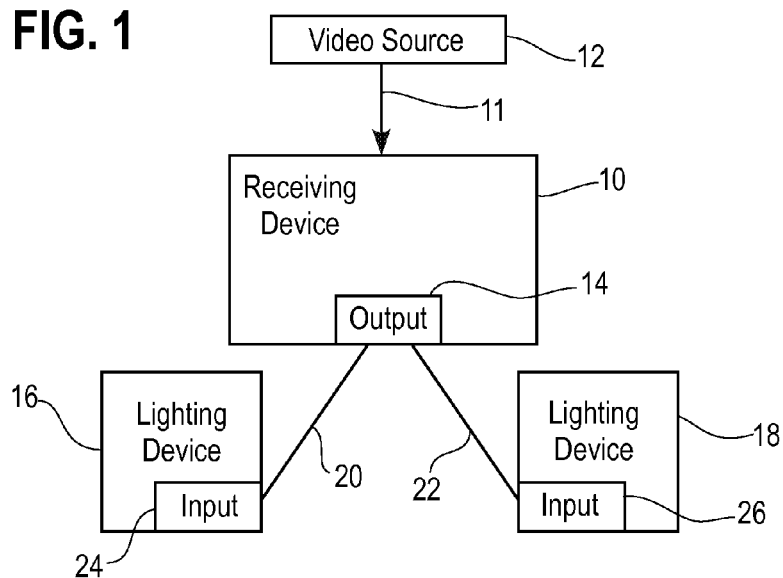
FIG. 1 is a schematic view of an exemplary system for performing a method according to one embodiment.

With specific reference to FIG. 1, in one embodiment of a method of controlling ambient light effects, a receiving device 10 receives video files from a video source 12 via a connection 11. The receiving device 10 can be any one of a television, set-top box, optical disc player such as a DVD-player or Blu-Ray player, portable media player, personal computer, laptop, tablet computer, gaming console, mobile phone, and the like.

The video source 12 can be any source capable of providing digital video files via a connection 11 to the receiving device 10. The video source 12 can be a cable head-end, a DVD or Blu-Ray disc, a video game disc, hard drive, or a digital media server capable of streaming to the receiving device. Although the receiving device 10 preferably receives the video files from the video source 12 via a wired connection 11, the connection 11 between the receiving device 10 and the video source 12 can also be wireless.

In one approach shown in FIG. 1, the receiving device 10 is directly connected to two lighting devices 16 and 18 via connections 20 and 22, respectively. The receiving device 10 has an output 14 and the lighting devices 16 and 18 each have an input 24 and 26, respectively, which can be interconnected via the respective connections 20 and 22. It is to be appreciated that the connections 20 and 22 can be either wired or wireless connections, and the receiving device 10 and the lighting devices 16 and 18 can be connected as described in more detail in co-pending Application entitled "VIDEO FILES INCLUDING AMBIENT LIGHT EFFECTS," filed on Oct. 11, 2012, the entire disclosure of which is incorporated by reference herein.

The lighting devices 16 and 18 can be any type of household or commercial device capable of producing visible light. For example only, the lighting devices 16 and 18 may be stand-alone lamps, track lights, recessed lights, wall-mounted lights or the like. In one approach, the lighting devices 16 and 18 are capable of generating light having color based on the RGB model or any other visible colored light in addition to white light. In another approach, the lighting devices 16 and 18 are also adapted to be dimmed.

The receiving device 10 has been shown in FIG. 1 as being connected to two lighting devices 16 and 18 by way of example only, and it will be appreciated that that the receiving device 10 can be connected to any number of lighting devices 16 and 18 suitable for a given room where the receiving device 10 is located. In one exemplary approach, the receiving device 10 may be connected to only one lighting device 16. In another approach, the receiving device 10 may be connected to four lighting devices each located in a corner of a room, in another approach, the receiving device 10 may be connected to at least two lighting devices located in front of a user, at least two lighting devices located on right and left sides of the user, and at least two lighting devices located behind the user so as to create a surround ambient light effect for the user. It is to be appreciated that the lighting devices 16 and 18 can be identical to each other, or can be different such that the receiving device 10 can be simultaneously connected to two, three, four, or more types of different lighting devices.

Figure 2:
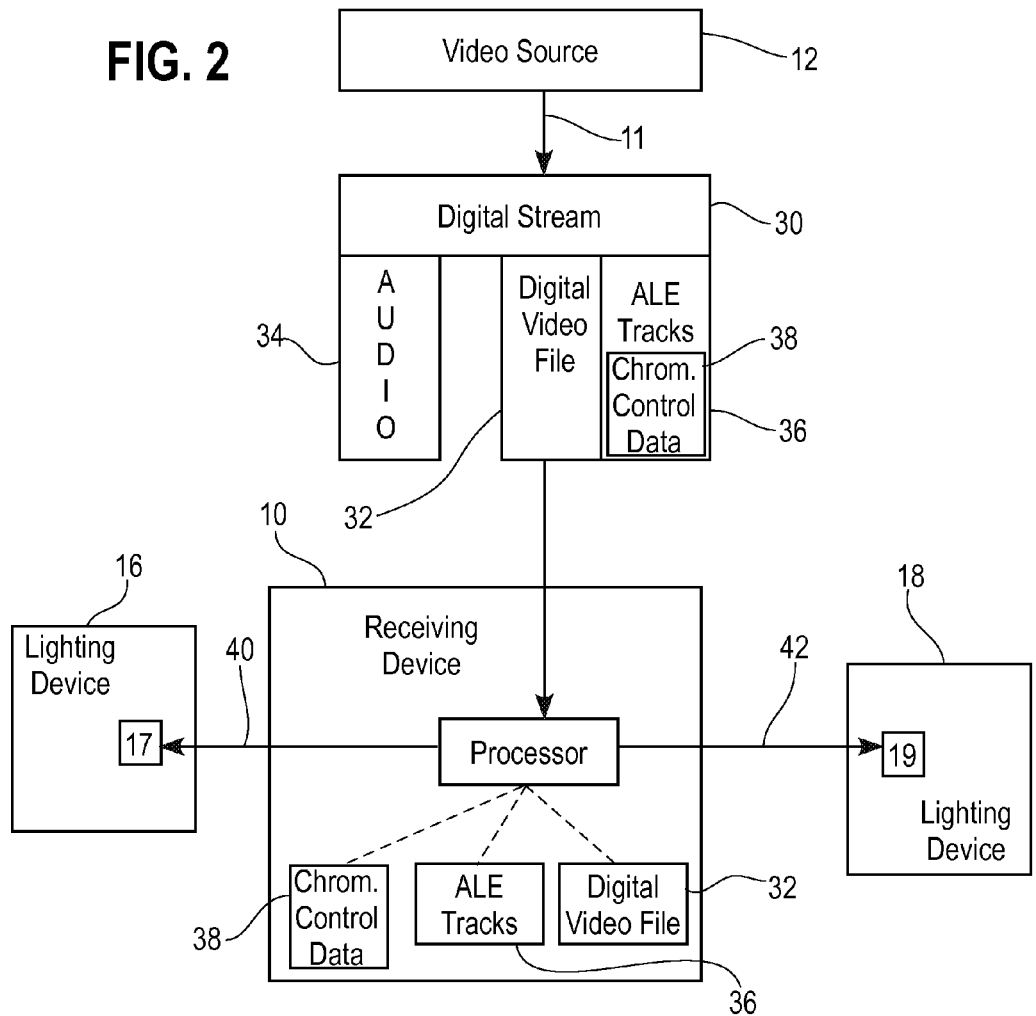
FIG. 2 is a schematic diagram of an exemplary video stream and an exemplary system for performing a method according to another embodiment.

With reference to FIG. 2, the receiving device 10 is adapted for parsing an incoming digital video signal or a digital video file coming from a video source 12. For example only, the receiving device 10 may include a processor 13 that is programmed to parse an incoming digital video signal or digital video file. For purposes of this application, the term "processor" will be understood to mean any hardware component capable of parsing the incoming digital video signal or digital video file. For example, the processor 13 may be a decoder or part of a graphics card.

FIG. 2 shows an exemplary digital video stream 30 incoming from the video source 12 and being received by the receiving device 10. The digital video stream 30 includes a digital video file 32 and a digital audio file 34. In one approach, at least one portion of the video file 32 is a predetermined event or a scene in a video contained in the video file 32 that is associated with the at least one ambient light effect.

The digital video stream 30 also includes additional ALE tracks 36 including data specifying at least one ambient light effect associated with one or more portions or scenes of the program, movie, or game contained in the digital video file 32. In one approach, the ALE tracks 36 include chrominance control data 38 specifying at least one light color to be generated by one or more of the lighting devices 16 and 18 as will be discussed in more detail below. In another approach, the ALE tracks 36 can also include data specifying at least one lighting device for generating the at least one ambient light effect specified in the ALE track 36.

When the digital video stream 30 is received by the receiving device 10 from the video source 12, the processor 13 performs the parsing of the digital video file 32 to separate one or more ALE tracks 36 and detect data representing one or more ambient light effects included in the ALE tracks 36. The processor 13 of the receiving device 10 is also programmed to perform the parsing of the ALE tracks 36 to detect the chrominance control data 38 contained in the ALE tracks as shown in FIG. 2.

The processor 13 of the receiving device is also programmed to produce and send one or more commands one or more lighting devices to generate the one or more ambient light effects specified in one or more ALE tracks 36 and by the chrominance control data 38. For example only, the processor 13 can cause the receiving device 10 to send a first command 40 to the lighting device 16 to generate a first ambient light effect specified in the ALE track 36 and the chrominance control data 38, and send a second command 42 to the lighting device 18 to generate a second ambient light effect specified in the ALE track 36. The first and second ambient light effects produced based on the commands 40 and 42 may be the same or different.

In one approach, the chrominance control data 38 specifies at least one color selected from red, green, blue, or combinations thereof. In an approach, the ALE tracks 36 can specify intensity of the colors specified by the chrominance control data 38. In another approach, the ALE tracks 36 can specify at least one of the lighting devices 16 and 18 for generating one or more light colors specified by the chrominance control data 38. In yet another approach, the ALE tracks 36 include a predetermined time when the one or more light colors specified by the chrominance control data 38 is to be generated by one or more of the lighting devices 16 and 18.

The lighting devices 16 and 18 can include hardware components 17 and 19, respectively. For example only, the hardware components 17 and 19 can be decoders programmed to interpret the chrominance control data 38 received in the commands 40 and 42, respectively, from the receiving device 10. In an approach, the hardware components 17 and 19 can be configured to cause the lighting devices 16 and 18, respectively, to generate one or more of the light colors specified by the chrominance control data 38.

In an approach, the lighting devices 16 and 18 may include at least one software component adapted for interpreting the chrominance control data 38 received in the commands 40 and 42 from the receiving device 10. In one approach, the software component can be adapted to cause the lighting devices 16 and 18 to generate one or more of the light colors specified by the chrominance control data 38.

When the commands 40 and 42 from the receiving device 10 are received by the lighting devices 16 and 18, the lighting devices 16 and 18 generate the ambient light effects specified in the commands 40 and 42. As such, the ambient light effects specified in the ALE tracks 36 and the chrominance control data 38 are generated by the lighting devices 16 and 18, preferably, when the one or more portions of the digital video file 32 associated with one or more ambient light effects specified in the ALE tracks 36 and chrominance control data 38 are displayed to the user.

The generation of the ambient light effects including a variety of colors by the lighting devices 16 and 18 in association with scenes, action sequences, and events specified in the ALE tracks 36 and chrominance control data 38 creates an enhanced and visually pleasing and interactive experience for a user watching a television program or a movie, or playing a video game.

The ambient light effects specified in the ALE tracks 36 and chrominance control data 38 can be associated with any portion of the video file 32. For example, portions of the video file 32 with which an ambient light effect can be associated include, but are not limited to, background settings (day, night, outdoor, indoor, etc.), action sequences (e.g., car chases, explosions, fights, etc.), specific events (e.g., a character is born, a character goes to sleep or wakes up, a character dies, etc.). By way of example only, the lighting devices can generate a yellow light effect for an action sequence taking place during the day in a desert and to a blue ambient light effect for an action sequence taking place deep under water in the ocean.

In one approach, a graphical user interface can provided to a user to permit the user to configure one or more options for controlling the generation of the ambient light effects by the lighting devices 16 and 18 based on the chrominance control data 38 contained in the ALE tracks 36. This advantageously results in a more personal and enhanced experience for each specific user.

In one approach, authoring or rendering software adapted to provide for the creation of ALE tracks 36 and the chrominance control data 38 in the ALE tracks 36 associated with one or more portions of the video file 32. The software can also provide for the writing of the ALE tracks 36 to the video file 32, and for the reading and/or parsing of the ALE tracks 36 and chrominance control data 38 in the ALE tracks 36. Such software can be provided both at a point of origin of the video file 32 such as a cable head-end, or integrated into the receiving device 10, or both. The authoring software thus can be a helpful tool for both a content provider and a content user.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. A method of producing an ambient light effect, the method comprising:

providing a receiving device configured to parse an incoming video file;

receiving the video file at the receiving device, the video file including at least one track specifying at least one ambient light effect associated with at least one portion of the video file, the at least one track including chrominance control data specifying at least one light color to be generated by at least one lighting device in communication with the receiving device;

parsing the video file at the receiving device to separate the at least one track specifying the at least one ambient light effect;

sending a command from the receiving device to the at least one lighting device specified in the at least one track to generate the at least one ambient light effect specified in the at least one track; and causing the at least one lighting device specified in the at least one track and receiving the command to generate the at least one light color specified by the chrominance control data when the at least one portion of the video file associated with the at least one ambient light effect is displayed.

2. The method of claim 1, wherein the receiving device can be selected from a television, set-top box, disc player, personal computer, laptop, tablet computer, and mobile phone.

3. The method of claim 1, wherein the at least one color specified by the chrominance control data is selected from red, green, blue, or combinations thereof.

4. The method of claim 1, further comprising providing the receiving device including at least one hardware component programmed to parse the video file to separate the at least one track specifying the chrominance control data.

5. The method of claim 1, further comprising, specifying, in the at least one track, color intensity of the at least one light color specified by the chrominance control data.

6. The method of claim 1, further comprising providing the at least one lighting device including at least one hardware component programmed to interpret the chrominance control data received in the command from the receiving device.

7. The method of claim 6, wherein the at least one hardware component causes the at least one lighting device to generate the at least one light color specified by the chrominance control data.

8. The method of claim 6, further comprising providing the at least one lighting device with at least one software component programmed to interpret the chrominance control data received in the command from the receiving device.

9. The method of claim 8, wherein the at least one software component causes the at least one lighting device to generate the at least one light color specified by the chrominance control data.

10. The method of claim 1, wherein the at least one track identifies the at least one lighting device for generating the at least one light color specified by the chrominance control data.

11. The method of claim 1, wherein at least one track includes a predetermined time when the at least one light color based specified by the chrominance control data is to be generated by the at least one lighting device.

12. The method of claim 1, wherein the at least one portion of the video file is a predetermined event in a video contained in the video file, the predetermined event being associated with the at least one ambient light effect.

13. The method of claim 1, wherein the sending a command from the receiving device to the at least one lighting device includes sending the command from the receiving device to the at least one lighting devices via one of a wired connection and a wireless connection.

14. The method of claim 1, wherein the sending a command from the receiving device to the at least one lighting device includes sending the command from the receiving device to the at least one lighting devices via a home automation system.

15. A system for controlling ambient light effects comprising:

a receiving device including at least one hardware component including a processor programmed to parse an incoming video file to separate at least one track specifying at least one ambient light effect associated with at least one portion of the video file;

at least one lighting device in communication with the receiving device;

wherein the at least one track includes chrominance control data specifying at least one light color to be generated by the at least one lighting device;

wherein the processor of the receiving device is programmed to send a command from the receiving device to the at least one lighting device to generate the at least one ambient light effect specified in the at least one track; and wherein the at least one lighting device includes at least one hardware component adapted, after receiving the command from the receiving device, to generate the at least one light color specified by the chrominance control data when the at least one portion of the video file associated with the at least one ambient light effect is displayed to a user.

16. The system of claim 15, wherein the receiving device is selected from one of television, set-top box, disc player, personal computer, laptop, tablet computer, and mobile phone.

17. The system of claim 15, wherein the at least one color specified by the chrominance control data is selected from red, green, blue, or combinations thereof.

18. The system of claim 15, wherein the at least one track identifies the at least one lighting device for generating the at least one light color specified by the chrominance control data.

19. The system of claim 15, wherein the at least one portion of the video file is a predetermined event in a video contained in the video file, the predetermined event being associated with the at least one ambient light effect and the at least one light color specified by the chrominance control data.

20. The system of claim 15, wherein the receiving device and the at least one lighting device are adapted to communicate directly and indirectly via one of a wired connection and a wireless connection.

* * * * *